United States Patent [19]
Brooks

[11] Patent Number: 5,203,017
[45] Date of Patent: Apr. 13, 1993

[54] METHOD AND APPARATUS FOR ESTABLISHING WIRELESS COMMUNICATION WITH MULTIPLE CUSTOMER STATIONS

[75] Inventor: Randall D. Brooks, Spring Valley, Calif.

[73] Assignee: H. M. Electronics, Inc., San Diego, Calif.

[21] Appl. No.: 600,307

[22] Filed: Oct. 19, 1990

[51] Int. Cl.⁵ .............................................. H04B 7/26
[52] U.S. Cl. .................................... 455/54.1; 455/14
[58] Field of Search ........................ 455/314, 5, 41, 14, 455/53, 54, 55, 89; 340/825.72, 825.44; 379/55, 272, 296; 381/79-81, 85

[56] References Cited
U.S. PATENT DOCUMENTS
4,866,732  9/1989  Carey et al. ........................... 455/55

Primary Examiner—Reinhard J. Eisenzopf
Assistant Examiner—Chi H. Pham
Attorney, Agent, or Firm—Bernard L. Kleinke; Jerry R. Potts; William Patrick Waters

[57] ABSTRACT

A wireless communication system is adapted to be used as an intercom system in a multiple customer station configuration. A customer service representative portable transceiver communicates wirelessly with a stationary base station to enable the representative to move freely about, and thus be able to perform other tasks. The base station is connected electrically to a group of substantially similar physically spaced apart remote customer drive up stations. Each of the remote stations includes a call initiating device for enabling a customer at a drive up station to request communications with the representative. The base station includes a signal generator, which responds to a call initiating device requesting a communication link. A transmitter responds to the generator to send an attention attracting signal to the representative's transceiver, so that the representative can cause the establishment of an audio communication link to a selected customer station.

5 Claims, 10 Drawing Sheets

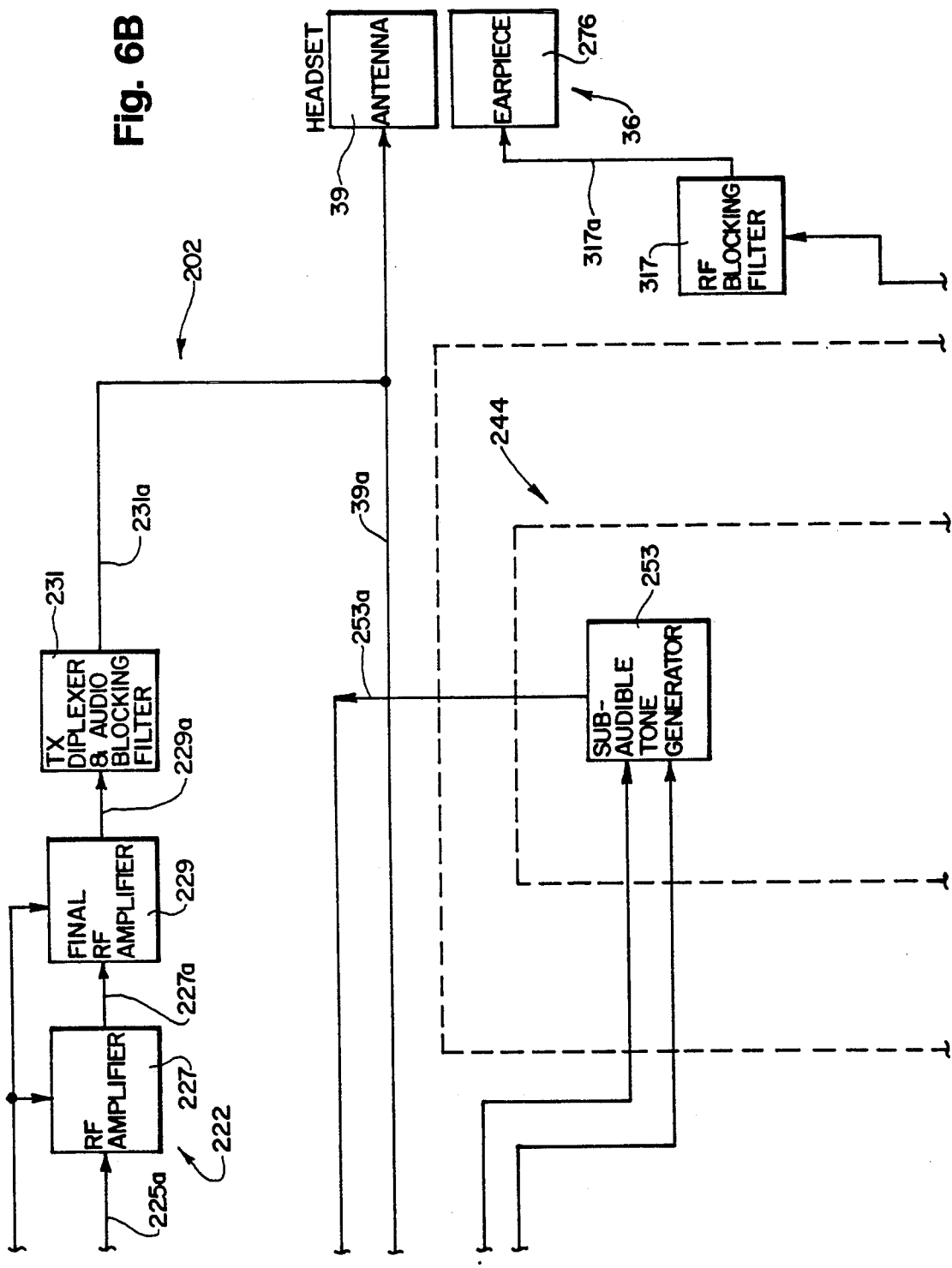

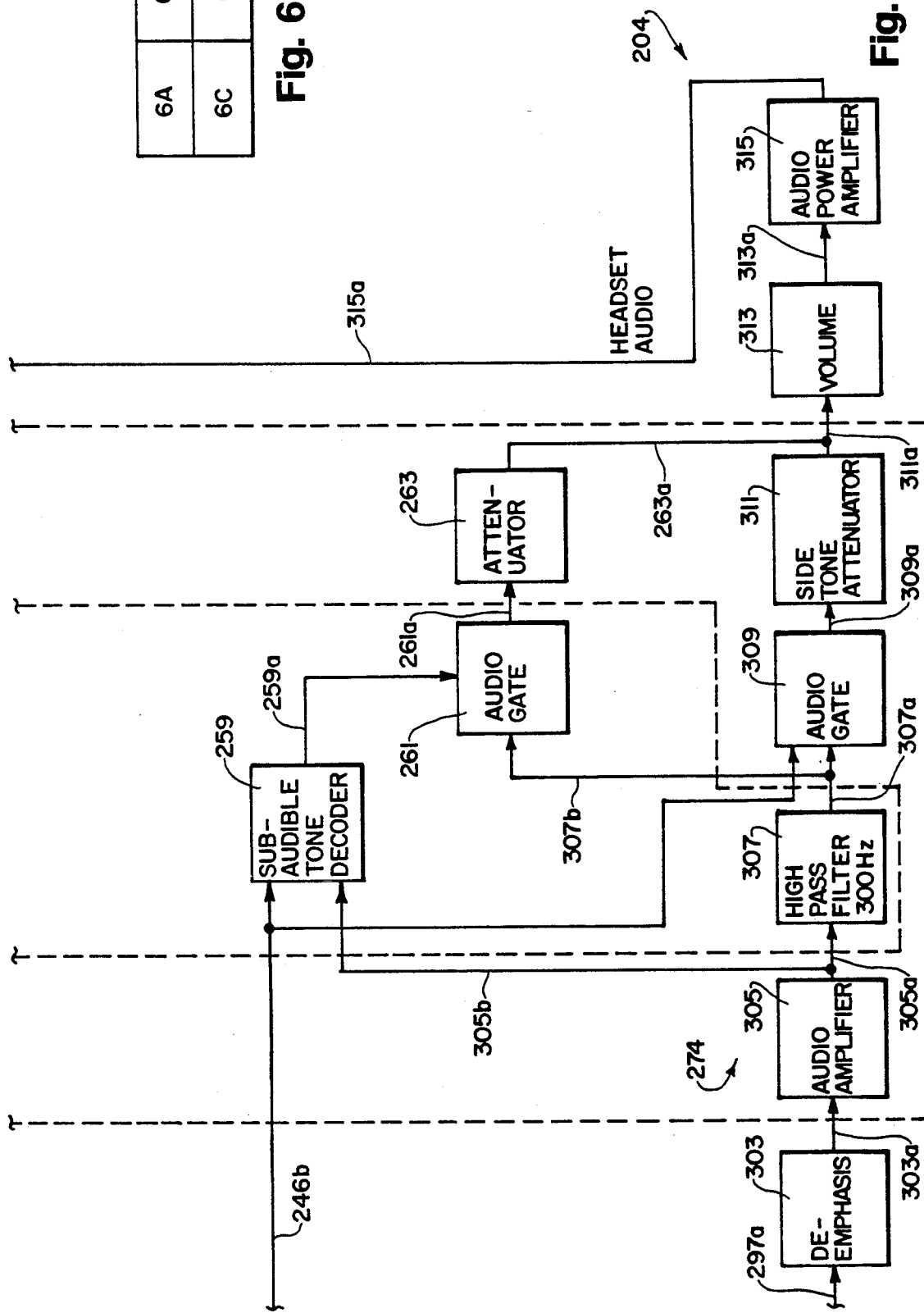

METHOD AND APPARATUS FOR ESTABLISHING WIRELESS COMMUNICATION WITH MULTIPLE CUSTOMER STATIONS

CROSS-REFERENCE TO RELATED APPLICATIONS

This application is related to U.S. patent application Ser. No. 07/600,605 filed Oct. 19, 1990, entitled "METHOD AND APPARATUS FOR MULTIPLE CUSTOMER STATION WIRELESS COMMUNICATION."

TECHNICAL FIELD

The present invention relates in general to a communication system and method of using it to establish wireless communication with multiple customer stations. More particularly, the present invention relates to a communication system for short range use in commercial business systems, such as for use in a bank teller system, or the like, where customer stations are provided at drive up lanes.

BACKGROUND ART

Communication systems are well known in certain industries, and have, for example, gained wide spread recognition for certain businesses. For example, in the fast food business, a customer can drive up to an outdoor customer station, and communication with an order taker over a radio frequency communication system. This system is activated, when the vehicle is positioned adjacent to the customer station.

Such a system would not be entirely satisfactory for other businesses. For example, in a business, such as the banking business, bank customers also can drive up to an outdoor customer station, and conduct a banking transaction.

However, the customer frequently does not require the assistance of a company service representative, such as a teller. In this regard, the customer can oftentimes complete the transaction completely unassisted by bank personnel. Thus, it is not at all desirable to establish the communication link with the service representative, and thus if it were established each time, the background noise of the communication system would be heard in the bank or other business establishment. Also, the communication equipment would be used needlessly, and thus be subjected to unwanted premature repairs or replacement.

This problem is compounded by the fact that in certain businesses require a relatively large number, such as ten, stations. While there may be as many as ten or more customers present, none of them may require assistance. Thus, it would not be desirable to activate all ten stations.

In order to effectively and efficiently service a large number of customer stations, it is desirable to employ wireless communication systems. With such systems, it would similarly not be desirable to activate the system each time.

Thus, it would be highly desirable to have a new and improved multiple customer station wireless communication system, which is not activated each and every time the customer is present.

DISCLOSURE OF INVENTION

Therefore, the principal object of the present invention is to provide a new and improved wireless multiple customer station communication system and method of using it, without activating the system every time a customer is present at a station.

Briefly, the above and further objects and features of the present invention are realized by providing a new and improved multiple customer station wireless communication system, without the need for activating the system each time a customer is present at a station.

A wireless communication system is adapted to be used as an intercom system in a multiple customer station configuration. A customer service representative portable transceiver communicates wirelessly with a stationary base station to enable the representative to move freely about, and thus be able to perform other tasks. The base station is connected electrically to a group of substantially similar physically spaced apart remote customer drive up stations. Each of the remote stations includes a call initiating device for enabling a customer at a drive up station to request communications with the representative. The base station includes a signal generator, which responds to a call initiating device requesting a communication link. A transmitter responds to the generator to send an attention attracting signal to the representative's transceiver, so that the representative can cause the establishment of an audio communication link to a selected customer station.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 6A-6D are symbolic block diagrams of the communication unit of FIG. 5.

BEST MODE FOR CARRYING OUT THE INVENTION

Figure 1:
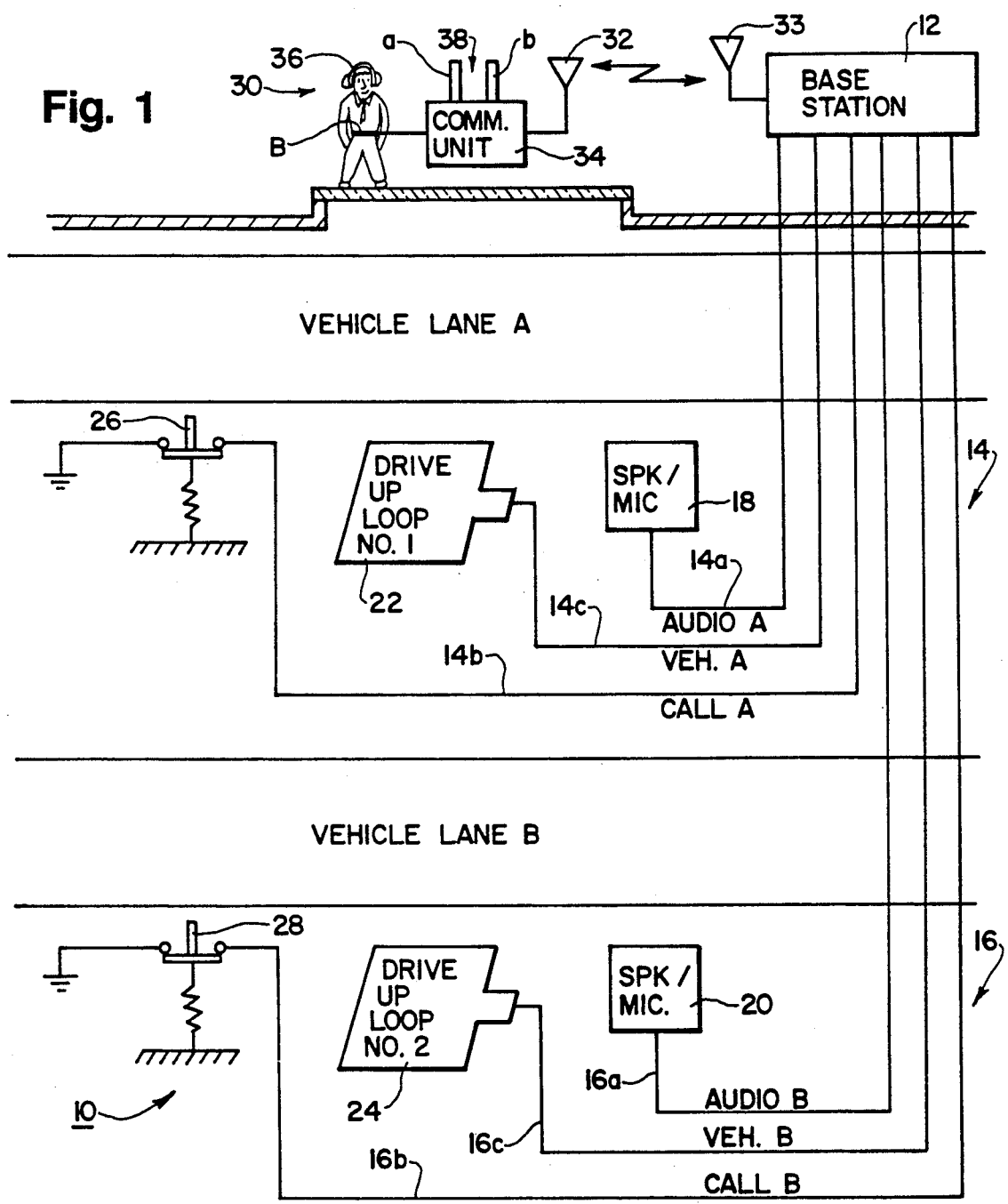
FIG. 1 is a block diagram of a short range communication system, which is constructed in accordance with the present invention, and which shows a base station interposed between a group of remote customer station and a customer service representative having a portable transceiver.

Referring now to the drawings and more particularly to FIG. 1 thereof there is illustrated a half duplex short range communication system 10, which is constructed in accordance with the present invention, and which is adapted for use as an intercom system. Thus, the system 10 can be used in banking system other similar industries requiring short range remote communications between a service representative and a plurality of remote customers.

While the preferred form of the present invention is designed to be used in a banking system for audible communications, it will become apparent to those skilled in the art that the principles of the present invention may be employed for other applications as well. For example, such as fast food restaurants where orders are taken from customers in a drive through system.

The system 10 generally includes a single base station or unit 12 for interconnecting in radio frequency communication a customer service representative 30 with a group of similar remote units or customer stations, such as the remote units 14 and 16. While only two remote units 14 and 16 are shown for illustrating purposes, it will become clear to those skilled in the art that many more remote units may also be used.

Each of the customer stations 14 and 16 are electrically coupled to the base station 12 and include a speaker/microphone unit, such as units 18 and 20 respectively. Although the speaker/microphone units are shown as single assemblies in the preferred embodiment it should be understood that separate speaker and microphone units could be used in lieu of the single assemblies.

In order to enable the customer service representative 30 to be alerted whenever a customer drives into the customer stations 14 or 16 in a vehicle (not shown), each of the customer stations 14 and 16 include a drive up loop, such as loops 22 and 24 respectively. Each of the customer stations 14 and 16 also include a call initiation button or switch, such as buttons 26 and 28 respectively, for enabling a customer to request service from the customer service representative 30. The speaker/microphone unit, and call button of each respective station 14 and 16 are disposed on speaker posts (not shown) conveniently located adjacent the respective drive up loops 22 and 24 in the vehicle lanes designated as "A" and "B" respectively associated with each respective station 14 and 16.

The base station 12 (FIG. 2) includes a transceiver control and transceiver board 30 for radio frequency communications with a portable communication unit 34 and a control logic board 31 for controlling the communication path between the communication unit 34 to and from each remote station, such as stations 14 and 16. The transceiver board 30 and control logic board 31 are interconnected by a board connector 32. The communication unit 34 has a belt B and is adapted to be carried around the waist of the customer service representative 30. The communication unit 34 is electrically coupled to a headset 36 for establishing two way voice communication with the customer service representative 30.

The communication unit 34 includes a switching arrangement, shown generally at 38, for enabling the customer service representative 30 to selectively establish a communication link with a desired one of the remote customer stations. In this regard, the switching arrangement include a set of paging switches, such as switches 38A and 38B for allowing the customer service representative 30 to selectively establish a communication link with a desired one of the remote customer station 14 and 16 respectively. When the customer service representative 30 establishes voice communication with a desired one of the remote customer stations, each of the other remote customer stations are inhibited from receiving the communications between the selected remote customer stations and the customer service representative 30.

Considering now the communication path between one of the remote customer stations, such as location 14 and the base station 12, assume a customer drives his or her vehicle (not shown) to the customer station 14. When the vehicle is disposed opposite the drive up loop 22, the loop 22 generates a signal which is coupled to the base station 12. This signal is coupled to the base station 12 on a conductor 14C and is used by a vehicle detector assembly 25 (FIG. 4A) to cause, in turn, a tone signal to be generated for alerting the customer service representative 30 that a customer is present and may require service. The drive up loop 22 and vehicle detector 25 are conventional, such as a model 3630314 sold and manufactured by Indicator Control Corporation, or model 93501 sold by Detector Systems. When a customer vehicle is present at the remote location 14, the loop 22 generates an enablement signal for alerting the service representative 30 that a vehicle is present. The customer may also, if desired, initiate a non-verbal communication with the customer service representative 30 for the purpose of requesting verbal communications.

In this regard, if the customer at station "A" requires assistance, the customer may activate the call button 26 which generates a signal indicative of a request for service. This request signal is also coupled to the base station 12 and is used to cause, in turn, a second and distinctly different tone signal to be generated informing the customer service representative 30 that a customer requires assistance. When the service representative 30 receives the request signal, the representative activates the paging switch 38A and transmits an intelligent message to the customer. For example, the representative could say "good morning, how may I help you?"

When the customer representative 30 actuates the paging switch 38A a given sub-audible tone signal is transmitted to the base station 12. Upon receipt of this sub-audible tone signal, the base station 12 immediately establishes a voice communication path by connecting the base station voice communication path to the remote customer station requesting assistance. When the customer service representative 30 releases the switch 38A, a communication path between the customer and the customer representative 30 is established allowing the customer to establish voice communication with the representative 30 via his or her microphone/speaker. If the representative 30 need to communicate further information to the customer, the representative again depress the switch 38A and communicates with the customer. When the representative 30 has completed his or her communications, the representative 30 depresses and releases the switch 38A in a rapid manner which terminates the communication path with the customer at station 14. As will be explained hereinafter in greater detail, this voice connection will remain established until either the vehicle leaves the remote customer station, or the customer service representative 30 establishes a communication path with a different selected party.

Considering now the base station 12 in greater detail with reference to FIGS. 1, 2, 3 and 4, the base station 12 transmits and receives half duplex radio frequency communication signals to and from the portable communication unit 34 carried by service representative 30. In this regard, the base station 12 includes a short range antenna 33 for transmitting and receiving radio frequency signals. As best seen in FIGS. 4A and 4B, the control logic board 31 of the base station 12 is wired electrically to the customer stations 14 and 16 by cables 14A, B, C and 16A, B, C respectively.

Figure 2:
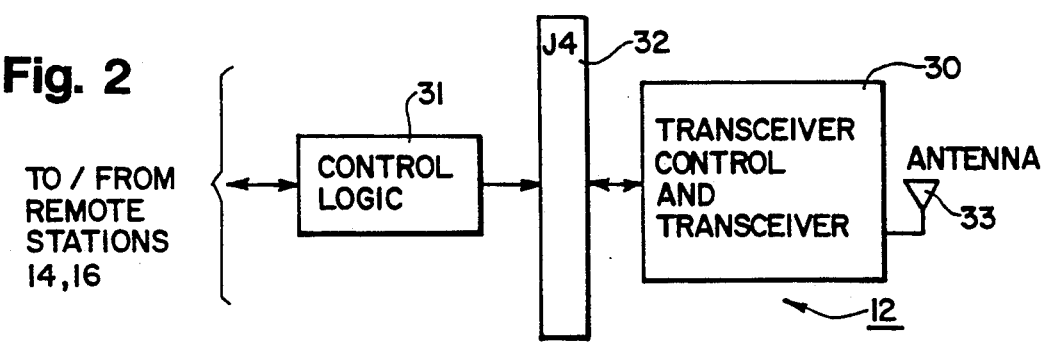
FIG. 2 is a block diagram of the base station of FIG. 1.

Considering now the transceiver control and transceiver 30 in greater detail with reference to FIGS. 2, 3 and 4, the transceiver control and transceiver 30 processes communication signals between the customer stations 14 and 16 and the portable communication unit 34 carried by the service representative 30. In this regard, the transceiver control and transceiver 30 includes a transceiver 41 that is electrically coupled to the antenna 33 by a pair of transmission cables 33A and 33B respectively. Cable 33A carries the signals received by antenna 33 while cable 33B carries transmission signals to the antenna 33.

Figure 3A:
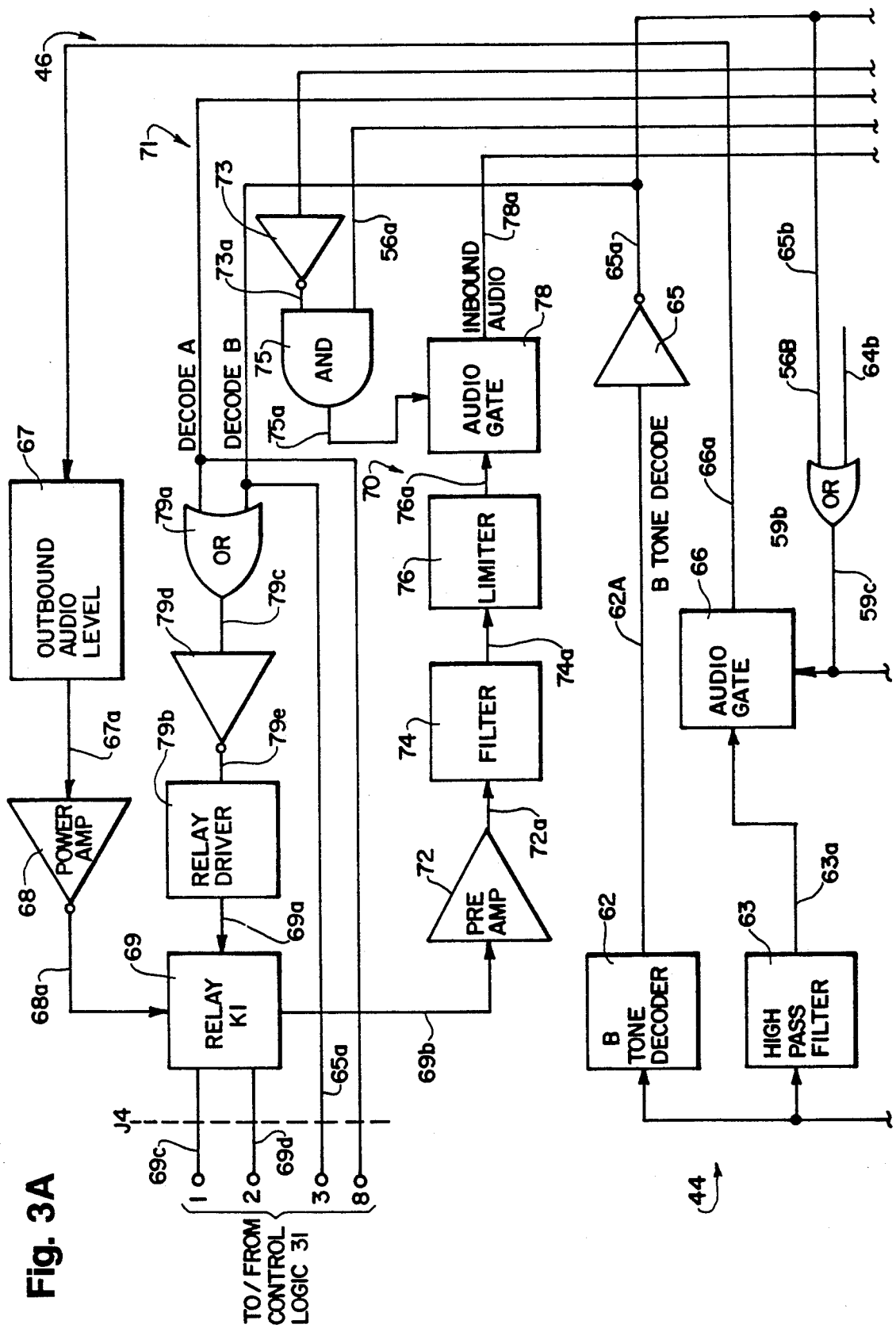
FIGS. 3A and 3B are symbolic block diagrams of the base station transceiver control and transceiver of FIG. 2.
Figure 3B:
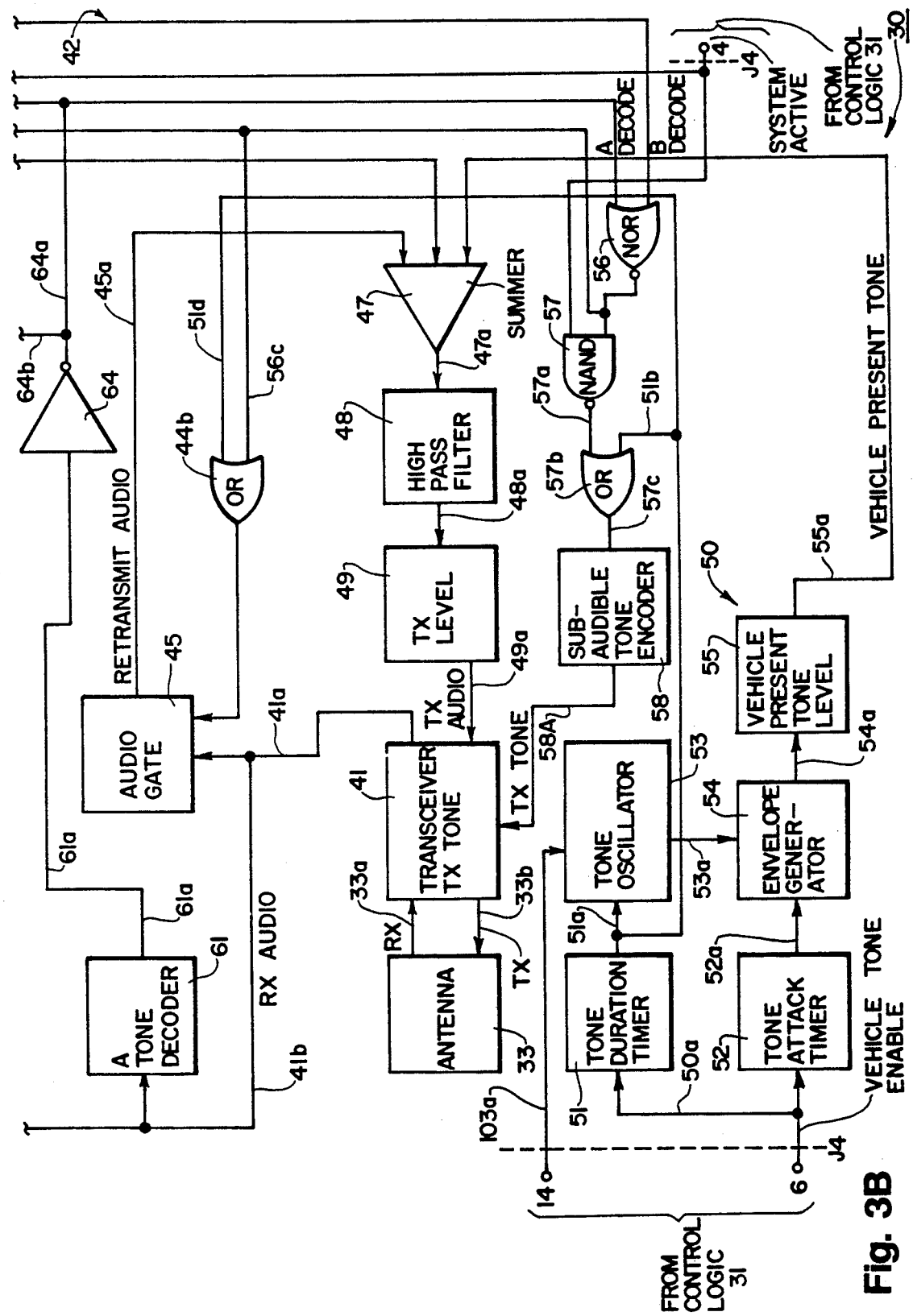

As best seen in FIG. 3B, the transceiver 41 converts the signals received on cable 33A into a message signal on conductor 41A generally indicated as RX AUDIO. The transceiver 41 also converts message signals processed by the base station 12 into radio frequency signals. These message signals are coupled to the transceiver 41 on conductors 49A and 58A respectively. These message signals are generally indicated as TX AUDIO and TX TONE respectively. the TX AUDIO and TX TONE signals are considered INBOUND signals to the customer service representative 30, while the RX AUDIO signal is considered an OUTBOUND signal to either the customer station 14 or the customer station 16. As will be explained hereinafter in greater detail, the RX AUDIO signal includes both a message signal and a sub-audible tone signal. The sub-audible tone signal is generated by the communication unit 34 and enables the service representative 30 to selectively switch pr direct the message signals to a desired one of the customer stations, such as stations 14 and 16.

The transceiver control and transceiver 30 includes a message switching arrangement, shown generally at 44 (FIG. 3A and 3B) for helping to direct the OUTBOUND message signal to a selected one of the customer stations. An inhibit circuit, shown generally at 46 (FIG. 3B), permits verbal messages transmitted by the customers (not shown) at station 14 and 16 to be blocked selectively from transmission to the customer service representative 30 until the service representative 30 enable the customer station INBOUND communication path to the communication unit 34. In this regard, it should be understood that although verbal messages are blocked except from the customer station selected, vehicle present tone signals, indicating the presence of a customer's vehicle and call tone signals indicating that a customer requires assistance are not blocked. Thus, the customer service representative 30 can always be aware whether or not a customer is present at the customer station and whether the customer requires assistance.

In order to enable the service representative 30 to verify that his or her message signal has been received by the base station 12, the transceiver control and transceiver 30 includes a retransmit circuit, shown generally at 42. The retransmit circuit 42 causes the audio message signals received from the service representative 30 to be transmitted back to the service representative 30 so the audio message may be heard in a speaker or earpiece 276 mounted on the headset 36 worn by the customer service representative 30.

Figure 4A:
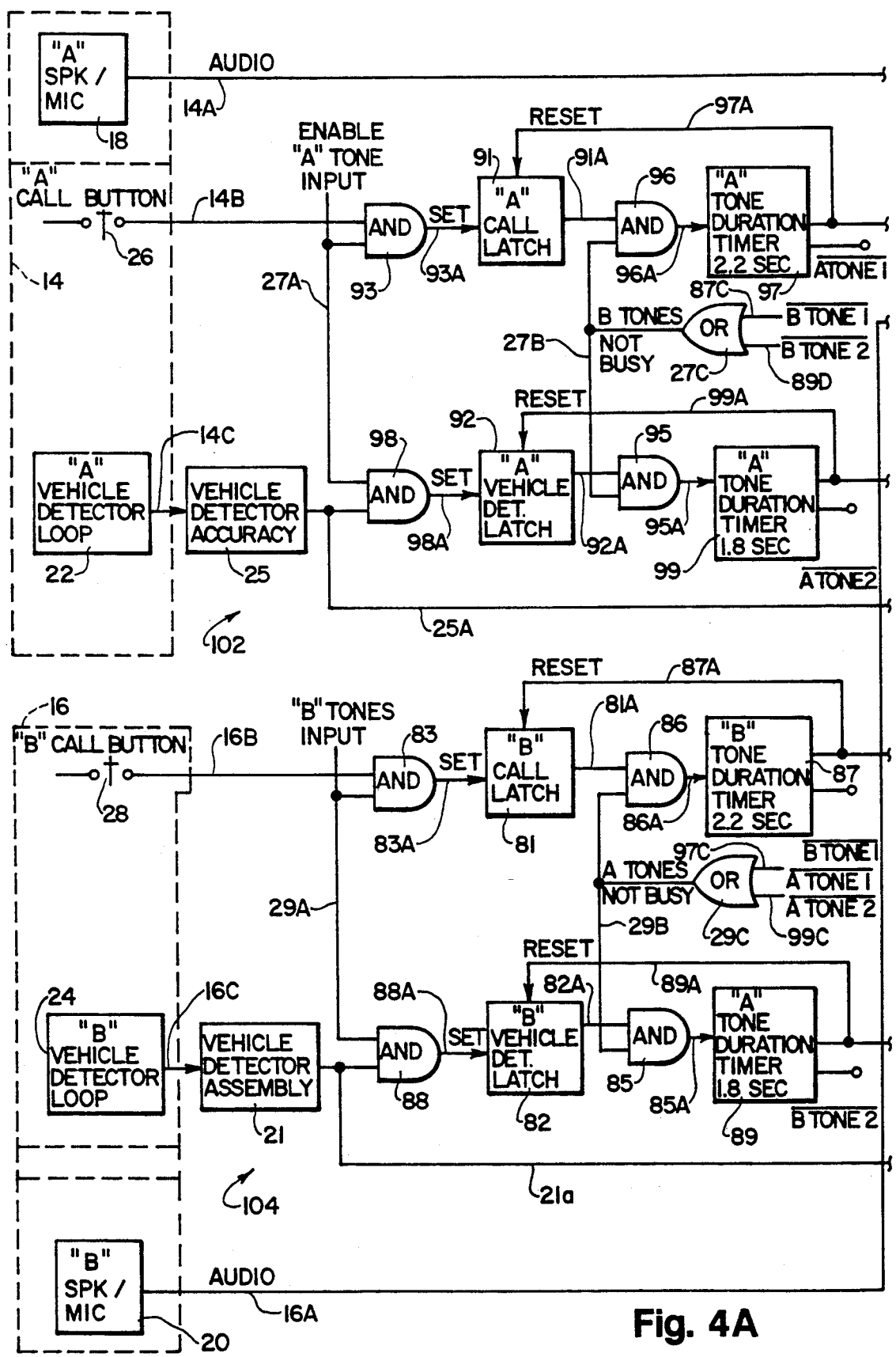
FIGS. 4A and 4B are symbolic block diagrams of the base station control logic of FIG. 2.
Figure 4B:
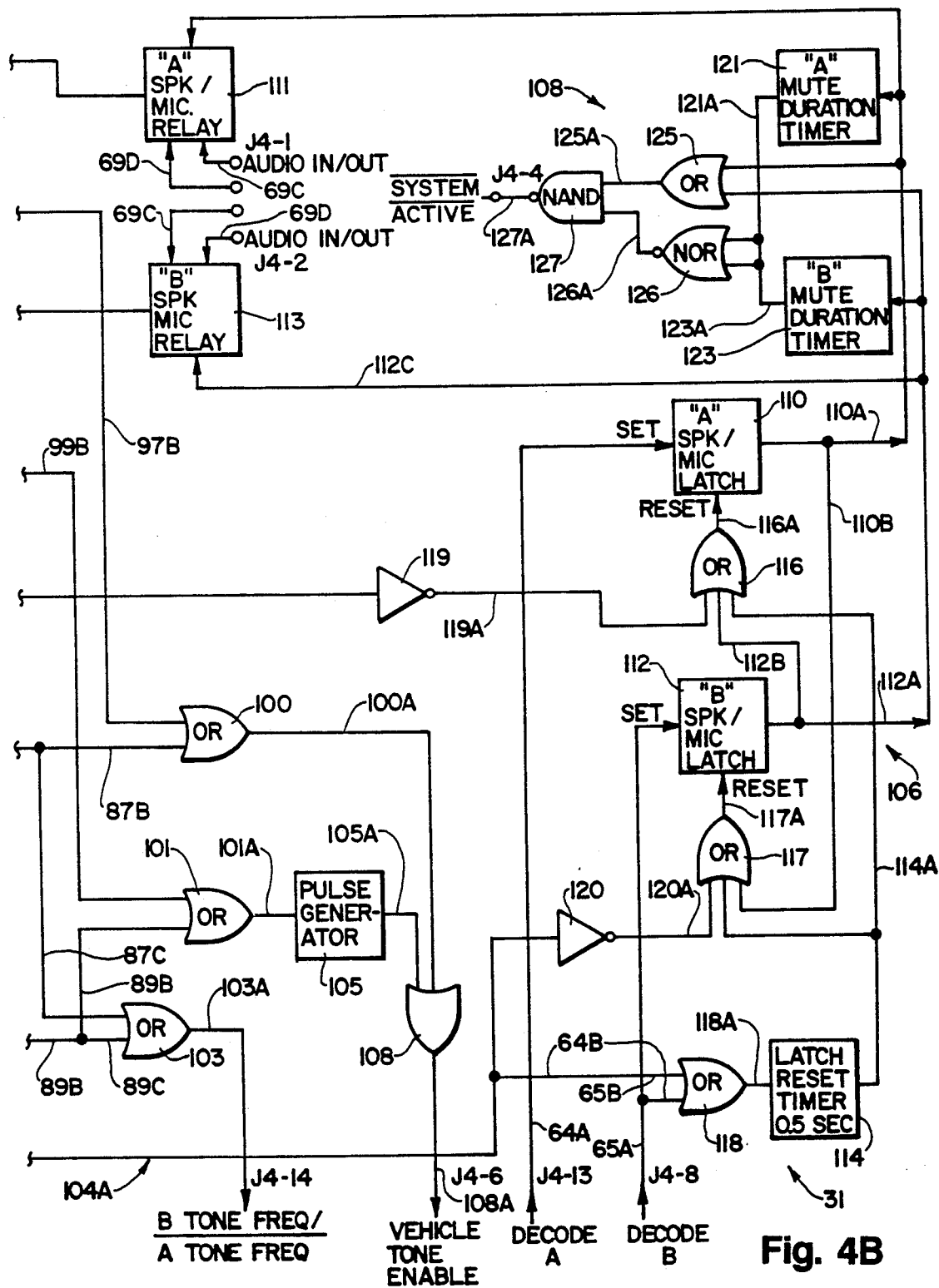

Considering now the control logic 31 in greater detail with reference to FIGS. 2, 4A and 4B, the control logic 31 is coupled between the transceiver control and transceiver 30 via the board connector 32 designated as J4 and the individual customer stations 14 and 16 via the cables 14A–C and 16A–C respectively. As best seen in FIG. 4, the control logic 31 generally comprises an "A" station control 102 and a "B" station control 104 for processing communication signals from the respective stations 14 and 16 to the transceiver control and transceiver 30. The control logic 31 also includes a speaker/-microphone control 106 for electrically coupling audio signals to and from the customer stations 14 and 16 and the transceiver control and transceiver 30 and for generating a system active signal indicative that one of the customer station speaker/microphone assemblies has been enabled by the customer service representative 30.

Considering now the INBOUND communication paths to the customer service representative 30 in greater detail with reference to FIGS. 1–4, there are four INBOUND communication signals transmitted to the communication unit 34 including a tone signal indicative that a customer at one of the stations 14 or 16 is requesting service; a vehicle present tone signal indicative that a vehicle is present at one or both of the respective customer stations 14 and 16; and two audio message signals: (1) a feedback or retransmit audio signal, to the customer service representative 30, repeating the verbal message of the representative 30 so he or she can verify that his or her verbal message has been received by the base station 12; and (2) an inbound audio signal indicative of the verbal message from one or the other of the respective customer stations 14 and 16.

Considering now the retransmit audio inbound signal with reference to the retransmit circuit 42 in greater detail with reference to FIG. 3B, each verbal message received from the customer service representative 30 via the communication unit 34, is coupled from the transceiver 41 to an audio gate 45, via the conductor 41A. As best seen in FIG. 3B, the audio gate 45 is controlled by an OR gate 44b whose output is connected to the control input of gate 45. OR gate 44b has two inputs, one from the tone duration timer 51 on a conductor 51d and the other from NOR gate 56. Whenever the output of OR gate 44b is a logical high the gate 45 is disabled and may not pass audio signals. The output of the audio gate 45 is connected to a summer 47 via a conductor 45A for summing various ones of the inbound communication signals into a single inbound signal designated as TX AUDIO. The output of the summer 47 is connected via a connector 47A to a high pass filter 48 for eliminating any spurious noise from the inbound signal. In order to control the transmission level of the signal passed by the high pass filter 48, the output of filter 48 is connected to a level control circuit 49 by a conductor 48A. The output of the level control circuit 49 is connected to the input of transceiver 41 for transmitting the received verbal message back to the service representative 30.

Considering now the vehicle present tone signal in greater detail, with reference to FIG. 3B, a tone generator 50 for producing a vehicle present tone indicative of a vehicle being present at either one of the respective stations 14 and 16 is coupled between the summer 47 and a tone control circuit 104A (FIG. 4B) for producing a vehicle tone enable signal. The tone control circuit 104A is part of the control logic 31. The tone generator 50 generally comprises a tone duration timer 51 for producing a tone signal having a given duration, a tone attack timer 52 for causing the tone signal to decay in amplitude over the given duration, an oscillator 53 and an envelope generator 54 for producing distinct and separate tone signals for each respective customer station 14 and 16, and a vehicle present tone level circuit 55 for controlling the static tone level of the vehicle present tone signal. The input to the tone duration timer 51 and tone attack timer 52 is the vehicle tone enable signal on conductor 50A received from the control logic 31 via pin 6 of the J4 connector. The outputs of the tone duration timer 51 and tone attack timer 52 are coupled to the tone oscillator 53 and envelope generator 54 respectively on conductors 51A and 52. A tone select signal designated as B tone frequency/not A tone frequency is coupled to the select input of oscillator 53 on a conductor 103a via J4 pin 14. The output from the tone duration timer 51 is also coupled by a conductor 51B to an OR gate 57B whose output is connected to a tone encoder 58 for generating the TX TONE signal. In this regard, whenever the tone duration timer produces a logical high signal, the OR gate 57B will be enabled thus allowing the tone encoder 58 to pass the sub-audible tone signal to the transceiver 41.

The tone oscillator 53 and envelope generator 54 are interconnected via conductor 53A. The output of the envelope generator 54 is connected to the vehicle present tone level network 55 via a conductor 54A, while the output of network 55 is connected to summer 47 by a conductor 55A.

Considering now the message switching arrangement 44 and its relationship to the INBOUND AUDIO signal in greater detail with reference to FIGS. 3A and 3B, the arrangement 44 generally comprises an "A" tone sub-audible decoder 61 and a "B" tone sub-audible decoder 62 for decoding sub-audible tone signals received from the communication unit 34. The sub-audible tone signals received from unit 34 are utilized to switch the massage channel between stations 14 and 16 respectively and to switch between INBOUND and OUTBOUND message signals. The arrangement 44 also includes a high pass filter 63 for filtering the message signal RX AUDIO from the output of transceiver 41. The output from transceiver 41 is coupled to the decoders 61 and 62 and the high pass filter 62 on the conductor 41B.

In operation each message signal transmitted by the communication unit 34 is accompanied by a sub-audible tone. The sub-audible tone is decoded by the respective tone decoders 61 and 62. If the received sub-audible tone is decoded by the "A" tone decoder 61 for example, its output signal will go to a logical low level causing a communication path to be established with station 14. A pair of invertors 64 and 65 are coupled to the normal high output signals of decoders 61 and 62 respectively via a pair of conductors 61A and 62A respectively. The output of high pass filter 63 is connected via a conductor 63A to the audio gate 66 for passing the OUTBOUND AUDIO signal to the speaker/microphone assemblies 18 and 20. The output of the audio gate 66 is enabled by the OR gate 59B whose output is connected to gate 66 by a conductor 59C. The OR gate 59B has two inputs, one from the output of invertor 65 (DECODE B) via the conductor 65b and another from the output of the invertor 64 (DECODE A) via a conductor 64b. The OR gate 59b controls the audio gate 66. In this regard, whenever the OR gate 59b goes to a logical high the audio gate 66 is enabled and audio signal will be able to be passed on the OUTBOUND communication path.

The output of audio gate 66 is coupled via a conductor 66A to a level control circuit 67 for controlling the amplitude of the OUTBOUND AUDIO signal. The output of level control 67 is connected to a power amplifier 68 via a conductor 67A for amplifying the audio signal. The amplified OUTBOUND AUDIO signal is connected to a relay 69 for permitting the OUTBOUND AUDIO signal to be coupled to the control logic 31.

From the foregoing it should be understood that when the service representative 30 releases the activated paging switch 38A or 38B the associated decode signal (DECODE A or DECODE B) will go to a logical low. This in turn will cause the output of OR gate 59B to go to a logic high level, disabling audio gate 66 from passing any further audio signals.

For the purpose of controlling the INBOUND signals, the inhibit circuit 46 controls the operation of an audio gate 78 whose output signal is designated IN-BOUND AUDIO and is received from the customer stations 14 and 16 respectively.

Considering now the inhibit circuit 46 in greater detail with reference to FIGS. 3A and 3B, the inhibit circuit 46 generally comprises an audio control arrangement 71 for enabling the INBOUND AUDIO signal to be coupled to the summer 47 and an encoder arrangement 77 for generating the TX TONE signal coupled to the transceiver 41.

The audio control arrangement 71 includes an AND gate 75 having two inputs. One input is from the output of an invertor 73 via a conductor 73A. The input to invertor 73 is SYSTEM ACTIVE coupled from the control logic 31 via a conductor 127A through the J4 convertor (pin 4). As will be explained hereinafter in greater detail the SYSTEM ACTIVE signal is normally a logical high whenever the system is not active and will go to a logical low level whenever the service representative 30 depresses one or the other of the paging switch 38A, 38B for longer than 0.5 seconds and a vehicle is present at one of the customer stations 14, 16. The other input to AND gate 75 is coupled to the output of the NOR gate 56 via a conductor 56A. The operation of NOR gate 56 has been explained previously. It should be understood that the output of AND gate 75 will be a logical high when the service representative 30 releases the activated paging switch (38A, 38B) and a vehicle is present at one of the customer stations 14 and 16. The output of AND gate 75 is coupled to the audio gate 78. In this regard, if the output of AND gate 75 is a logical high, the audio gate 78 is enabled and can pass signals received from the control logic 31.

The inhibit circuit 46 also includes an OR gate 79A, an invertor 79D, a relay driver 79B, and a relay 69 which are all connected in series. Relay 69 under the control of the relay driver 79B causes the communication path to the control logic 31 to be switched between the INBOUND signal path and the OUTBOUND signal path. If the signal path is in an OUTBOUND mode, the signals from the power amplifier 68 are coupled to a selected speaker/microphone 18, 20. If the signal path is an INBOUND mode, the signals from the selected speaker/microphone 18/20 is coupled to the preamplifier 72. As best seen in FIG. 3A, the output of relay driver 79B is coupled to the control input of relay 69 via conductor 69A. The audio in and out paths of relay 69 are coupled to preamplifier 72 and power amplifier 68 via the conductors 69B and 68A respectively. The output of OR gate 79A will go to a logical high whenever the decode A signal or the decode B signal goes to a logical high indicating that the service representative 30 has enabled one of the customer stations to receive a verbal message via its speaker/microphone assembly. When the service representative releases the activated paging switch (38A, 38B) the output of OR gate 79A gives to a logical low causing the output of invertor 79D to go to a logical high. When the output of invertor 79D is high the relay driver 79B is deactivated causing the relay 69 to switch the signal path from the OUTBOUND mode to the INBOUND mode.

As best seen in FIG. 3A, the INBOUND PATH includes the preamplifier 72, a filter 74, a limiter 76 and the audio gate 78 which are all connected in series. The output of preamplifier 72 is connected to the input of the filter 74 by a conductor 72a. The limiter 76 is coupled between the output of filter 74 and the input of audio gate 78 by conductors 74a and 76a respectively. The output of the audio gate 78 is connected to the summer 47 by a conductor 78A.

Considering now the "A" station control circuit 102 in greater detail with reference to FIG. 4A, the control circuit 102 includes a pair of latches 91 and 92 for latching the call signal and vehicle detection signal received from customer station 14 via cables 14B and 14C respectively. Latch 91 is set via an AND gate 93 whose output is coupled to latch 91 via a conductor 93A. AND gate 93 has two inputs, the call signal produced when a customer at station 14 depresses the call button 26 and an enable tone "A" input signal coupled to gate 93 via connector 27A. In this regard, whenever the customer depresses the call button 23 and the enable tone input signal is a logic high or "1", the output of AND gate 93 will go to a logical high causing the latch 91 to be set. The enable "A" tone signal on conductor 27A is used when more than two remote customer stations are included in the system. In this regard, as the preferred embodiment of the present invention includes only two remote customer stations, the enable "A" tone signal is not required and thus, is always a logical high.

The output from latch 91 is coupled to an AND gate 96 via a conductor 91A. The AND gate 96 has two inputs, one from the latch 91 and the other on conductor 27B from an OR gate 27C whose output signal is a logical high whenever customer station 16 is not busy. This signal is indicated as "B" tone not busy. The output of AND gate 96 is coupled via a conductor 96A to a one shot timer 97 having an output signal with a 2.2 second duration. The output of the timer 97 is coupled to the reset input of latch 91 via a conductor 97A. In this regard, when the output of timer 97 goes to a logical high, it immediately resets latch 91 causing the output of AND gate 96 to go to a logical low. The output of timer 97 is also coupled to an OR gate 100 via a conductor 97B. The OR gate 100 will therefore go to a logical high for 2.2 seconds whenever the one shot 97 is set. As best seen in FIG. 4A, the reset output of one shot 97, is designated not A TONE 1 is connected by a conductor 97C to the input of an OR gate 29C. The output of OR gate 29C is designated as "A TONES NOT BUSY" and is a logical high whenever customer station 14 is not busy.

The OR gate 100 forms part of the tone control 104A for generating the vehicle tone enable signal and the B tone frequency/not A tone frequency signal which are both coupled to the tone generator 50 via conductors 108A (J4, pin 6) and 103A (J4, pin 14) respectively. The tone control 104A also includes an OR gate 101, an OR gate 103, an OR gate 108, and a single pulse generator 105. The tone control 104A is used to help generate the vehicle present and call tone signals for alerting the service representative 30 of a vehicle present and the need of a customer for assistance.

Latch 92 is similar to latch 91 and has its set input coupled to an AND gate 98 via a conductor 98A. AND gate 98 has two inputs, one the enable tone "A" input signal on the conductor 27A and a vehicle detection signal from customer station 14 on conductor 25A. The vehicle detector signal is generated by the vehicle detector assembly 25. Latch 92 will be set wherever the enable "A" tone input signal on conductor 27A is a logical high and the vehicle detection signal is present on conductor 25A. As the enable "A" tone input signal is always a logical high, latch 92 will be set whenever a vehicle is present at the A customer station 14.

The output from latch 92 is coupled to an AND gate 95 via a conductor 92A. AND gate 95 has two inputs, one from latch 92 and the "B" tone not busy signal on the conductor 27B. The output of AND gate 95 is coupled to the set input of a one shot timer 99 via a conductor 95A. In this regard, whenever latch 92 is set and the "B" tone not busy signal is a logical high, the timer 99 will be set. Timer 99 is a one shot timer that generates a 1.8 second signal on is output. The output signal from timer 99 is coupled to the reset input of latch 92 via a conductor 99A and to an OR gate 101 via a conductor 99B. Whenever the output of timer 99 goes to a logical high, latch 92 is immediately reset, causing AND gate 95 to go to a logical low. This removes the input signal to timer 99 which returns to a logical low approximately 1.8 seconds later. The reset output of timer 99 is designated as not A TONE 2 and is connected to the input of OR gate 29C by a conductor 99C.

With respect to the two signals from timers 97 and 99 it should be noted that each is of a different duration. As will be explained herein, the output signal from timer 97 coupled to tone generator 50 for causing a decaying signal to be produced whenever the one shot 97 is set. The signal from timer 99 is also coupled to the tone generator 50 via the tone control circuit 104A. This signal causes a tone having a different duration and which ends abruptly. Thus, the two signals, when heard, can be readily distinguished as coming from either timer 97 or timer 99.

Considering now the "B" station control 104 in greater detail with reference to FIG. 4, the control 104 is similar to control 102 and is electrically connected to the call button 28 and the vehicle drive up loop 24 via cables 16B and 16C respectively. "B" station control 104 includes a pair of latches 81 and 82 which are substantially similar in their operation as latches 91 and 92 respectively. Latch 81 is set via an AND gate 83 having two inputs, the call signal produced when a customer at station 16 depresses the call button 28 and an enable tone "B" input signal coupled to gate 83 via a conductor 29A. The enable tone "B" signal is similar to the enable tone "A" signal described earlier and is always a logical high as only two customer stations are included in the preferred system. The output of AND gate 83 is coupled to the set input of latch 81 via a conductor 83A.

The output of latch 81 is connected to a one shot timer B7 via an AND gate B6. AND gate 86 has two inputs, one from the output of latch 81 via a conductor 81A and another on a conductor 29B from an OR gate 29C whose output signal is a logical high whenever customer station 14 is not busy. This signal is indicated as "A" tone not busy. The output of AND gate 86 is coupled to the one shot timer 87 via a conductor 86A. The one shot timer 87 generates a 2.2 second tone signal which is coupled to the reset input of latch 81. In this regard, when the output of timer 87 goes to a logical high, the signal immediately resets latch 81 causing the output of AND gate 86 to go to a logical low. The output of timer 87 is connected to latch 81 on a conductor 87A. The output of timer 87 is also coupled to the OR gate 100 on a conductor 87B and to the OR gate 101 on a conductor 87C. The reset output of timer 87 is designated as not B TONE land is coupled to the OR gate 27C on a conductor 87C.

As best seen in FIG. 4B, the output from OR gate 100 is coupled to an OR gate 108 via a conductor 100A. The OR gate 108 has two inputs, one from OR gate 100 and another from the single pulse generator 105 whose output is connected, via a conductor 105A to the OR gate 108. The output signal of OR gate 108 is designated "vehicle tone enable" and is coupled to the tone generator 50 on the conductor 108A.

Considering now latch 82 which is similar to latch 92, the input to latch 82 is coupled from a vehicle detection circuit 21 via an AND gate 88. AND gate 88 has two inputs, one on a conductor 21A from a vehicle detector circuit 21 and the other on the conductor 29A, enable "B" tone input, which is always a logical high as previously mentioned. The vehicle detection circuit 21 is similar to circuit 25 and is conventional. The output of AND gate 88 is coupled to the set input of a vehicle detection latch 82 via a conductor 88A.

The output for vehicle detection latch 82 is coupled to an AND gate 85 by a conductor 82A. The output of AND gate 85 is connected to a one shot timer 89 via a conductor 85A. AND gate 85 has two inputs, one from the vehicle detection latch 82 and another on a conductor 29B designated as "A" tone not busy.

One shot timer 89 is a 1.8 second timer and has its output connected to the reset of the latch 82 via a conductor 89A. In this regard, when the output of timer 89 goes to a logical high, latch 82 is immediately reset causing the output of AND gate 85 to go to a logical low. The output from timer 89 is connected to the OR gate 101 on a conductor 89B and to the OR gate 103 on a conductor 89C.

As best seen in FIG. 4B, the inputs to OR gate 103 are coupled to both the timers 87 and 89. Thus, whenever either one of the timers 87 or 89 produce a logical high output signal, the output of OR gate 103, indicated as B tone frequency/not A tone frequency, also goes to a logical high. From the foregoing, it should be understood that the output of OR gate 103 will only be a logical high when either timer 87 or timer 89 is set.

The OR gate 101 has its output coupled to the single pulse generator 105 via a conductor 101A. The single pulse generator 105 produced a pulsed signal which is utilized with the output signal from the OR gate 100 to produce the vehicle tone enable signal. The output of the pulse generator 105 is coupled to the OR gate 108. The OR gate 108 has two inputs, one from generator 105 on the conductor 105A and another on conductor 100A from the output of OR gate 100. The output of OR gate 108 is coupled to the transceiver board 30 in the base station 12 via a conductor 108A (J4-pin6).

Considering now the speaker/microphone control 106 in greater detail with reference to FIG. 4B, the speaker/microphone control 106 enables a selected one of speaker/microphones 18, 20 to be used for two way voice communications in response to a decoded subaudible tone signal produced by the communication unit 34. The speaker/microphone control 10 generally comprises a pair of latches 110 and 112 for controlling a corresponding pair of speaker relays 111 and 113 respectively. The speaker microphone relays 111 and 113 are directly connected to the speaker/microphones 18 and 20 via the audio cables 14A and 16A respectively. In this regard, whenever one of the speaker/microphone relays are enable a verbal message may be transferred to or from its associated speaker/microphone assembly to the transceiver control and transceiver 30. The latches 110 and 112 are set by the decode A and decode B signals respectively. The decode A signal is electrically connected to the set input of latch 110 via the conductor 64A coupled to the control logic board 31 through the J4 connector (pin 13). The decode B signal is connected to the set input of latch 112 via the conductor 65A coupled to the control logic board 31 through the J4 connector (pin 8).

In order to reset the latches 110 and 112 the speaker/microphone control 106 also includes a latch reset timer 114 which generates a reset signal whenever the decode A signal or the decode B signal goes to a logical high level for less than 0.5 seconds. The output of reset timer 114 is connected to a pair of OR gates 116 and 117, via a conductor 114A. OR gates 116 and 117 are connected to the reset inputs of latches 110 and 112 by conductors 116A and 117A respectively. The latch reset timer 114 produces a short duration logic high signal of approximately one half second only. In this regard, although the latch reset timer 114 will cause both latches 110 and 112 to be reset, if the set signal decode A or decode B remains at a logical high level for longer than one half second, the set signal will override the reset signal and the corresponding latch 110 or 112 will remain set. This feature is important because it enables the service representative 30 to control the enabling and disabling of the speaker/microphones 18 and 20 in an easy and convenient manner. For example, if the service representative 30 activates the paging feature for a duration of less than one half seconds both speaker/microphones 18 and 20 will be disabled, while if the paging feature is activated for a duration greater than one half second, only a selected one of the speaker/microphone 18, 20 will be enabled.

As best seen in FIG. 4B, an OR gate 118 having two inputs is connected to the set input of latch reset timer 114 by a conductor 118A. The inputs to the OR gate 118 are the decode A and decode B signals which are coupled to the OR gate 118 on conductors 64B and 65B respectively. From the foregoing it will be understood that the output of OR gate 118 will go to a logical high level whenever either one of the decode signals goes to a logical high level.

Considering now the reset OR gate 116 in greater detail with reference to FIG. 4, the OR gate 116 has three inputs, the output signal from the latch reset timer 114 on conductor 114A, the output signal from the B speaker/microphone latch 112 on a conductor 112B, and the vehicle detection signal from an invertor 119 on a conductor 119A. If the output signal of invertor 119 is a logical high, the signal is indicative of the absence of a vehicle at station 14. The output of OR gate 116 will go to a logic high level resetting latch 110 whenever any one of these signals goes to a logic high level. From the foregoing it should be understood that if the "A" speaker/microphone latch 110 was set, it will be reset whenever the vehicle at the "A" customer station leaves the station 14 or whenever the "B" speaker/microphone latch 112 is set, or whenever the latch reset timer 114 goes to a logical high (Without an overriding set signal being applied to the latch).

Considering now the OR gate 117 in greater detail with reference to FIG. 4B, the OR gate 117 has three inputs, the output signal from the reset latch timer 114 on the conductor 114A, the output signal from the A speaker/microphone latch 110 on a conductor 110B and the vehicle detection signal from an invertor 120 on a conductor 120A. If the output signal of invertor 120 is a logical high, the signal is indicative of the absence of a vehicle at station 16. The output of OR gate 117 will therefore go high whenever the reset timer 114 goes to a high level, or whenever the vehicle of the B station leave the station 16, or whenever the A speaker/microphone latch 110 is set.

As best seen in FIG. 4, the speaker/microphone control 106 also includes a pair of speaker/microphone relays 111 and 113 coupled via audio cables 14A and 16A between the speaker/microphones 18 and 20 respectively and the speaker/microphone latches 110 and 114 via conductor 110A and 112C respectively. The relays 111 and 113 are electrically connected to the outputs of relay 69 on a pair of conductors 69C and D through the J4 connector (pins 1 and 2). Whenever the enable signals form the latches 110 and 112 are logical high levels, the speaker/microphones 18 and 20 are coupled through relays 111 and 113 respectively to the service representative 30.

In order to mute the speaker/microphones 18 and 20 during switching periods, the speaker/microphone control 106 also includes a muting network 108. The muting network 108 includes a pair of mute duration timers 121 and 123, where timer 121 mutes the speaker/microphone 18 while timer 123 mutes the speaker/microphone 20. The muting network 108 also includes a NOR gate 125, an OR gate 126 and a NAND gate 127 for forming a control signal designated not SYSTEM ACTIVE indicative that one of the latches 110 or 112 is set at a logical high level. As will be explained hereinafter whenever either one of the speaker/microphone latches 110, 112 are set to a logic high, the muting network 108 delays the not SYSTEM ACTIVE signal on a conductor 127A from going to a logical low for a predetermined period of time established by timers 121 and 123.

As best seen in FIG. 4B, the OR gate 125 has two inputs, the output of latch 110 via the conductor 110A, and the output of latch 112 via the conductor 112A. OR gate 125 will go to a logical high level whenever either one of the latches 110, 112 are set to a logical high. The output of OR gate 125 is connected to the NAND gate 127 by a conductor 125A.

The NOR gate 126 has two inputs, the output of "A" mute duration timer 121 via a conductor 121A and the output of the "B" mute duration timer 123 via a conductor 123A. The output of NOR gate 126 is also connected to the input of NAND gate 127 by conductor 126A. From the foregoing it will be understood that whenever either one of the latches 110, 112 are set and the output of either one of the mute duration timers 121, 123 have timed out, the output of NAND gate 127 designated as not SYSTEM ACTIVE will be a logical low.

Figure 5:
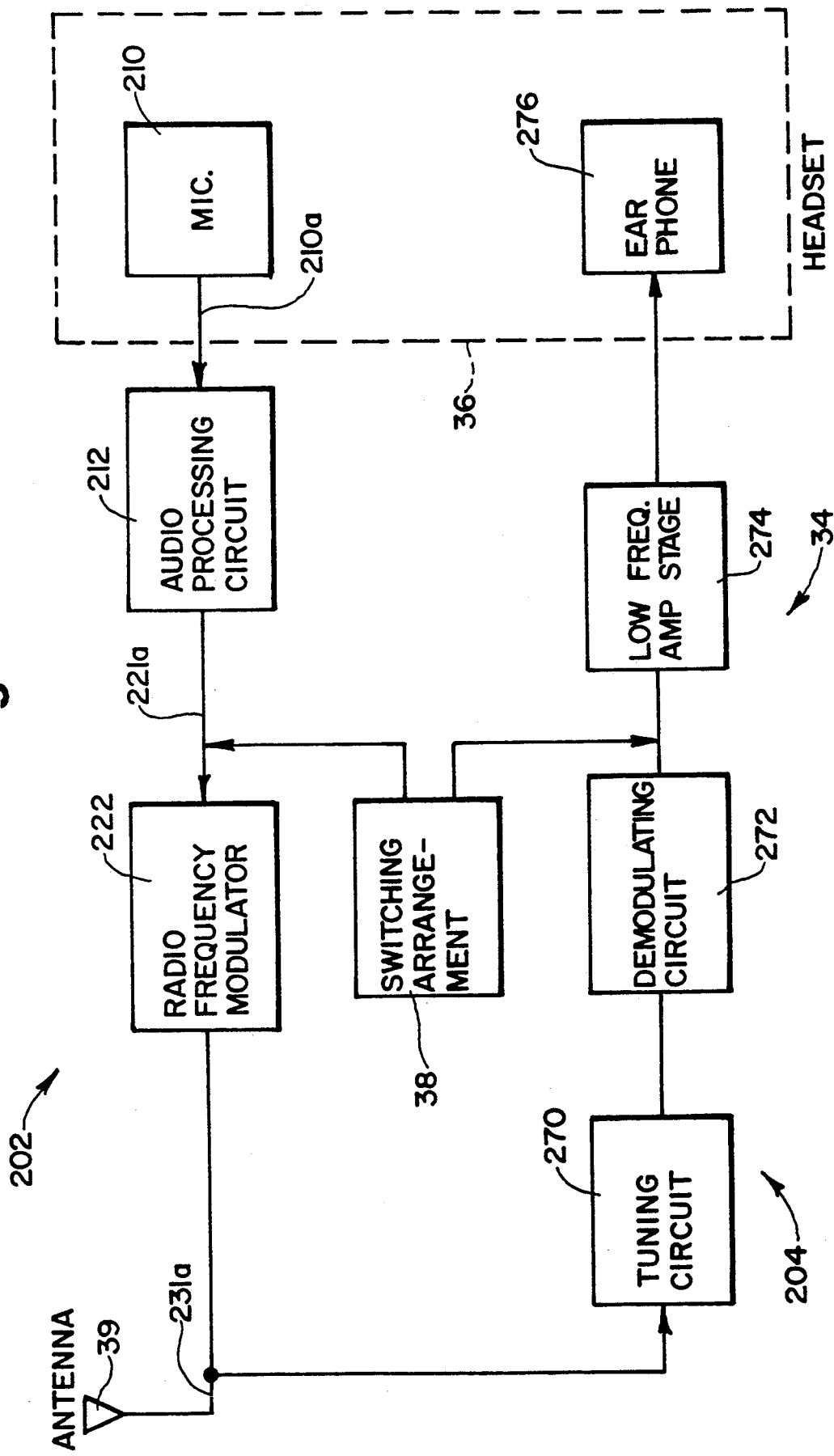
FIG. 5 is a symbolic block diagram of one of the communication unit of FIG. 1.

Considering now the communication unit 34 in greater detail with reference to FIG. 5, the communication unit 34 includes the antenna 39 which receives and transmits radio frequency signals to and from the base station 12. In order to transmit and receive verbal messages, the communication unit 34 also includes a radio transmitter shown generally at 202 and a radio receiver, shown generally at 204. The switching arrangement 38 associated with the communication unit 34 includes a switch arrangement including the switch 38A and 38B for applying power to the communication unit 34 and for selecting sub-audible tones to control the establishing of a communication path to or from a desired one of the customer stations, such as stations 14 and 16. In this regard, the communication unit 34 also includes a sub-audible tone generator/decoder 208 for transmitting and receiving sub-audible tones as will be explained hereinafter in greater detail.

Considering now the radio transmitter 202 in greater detail with reference to FIG. 5, the transmitter 202 is disposed between a microphone 210 for receiving verbal messages from the service representative 30 and the antenna 39 for transmitting radio frequency signals to the base station 12. The microphone 210 mounted to the headset 36 and is electrically connected by a conductor 210A to an audio processing circuit 212 for conditioning the low frequency audio signals for transmitting purposes.

The transmitter 202 also includes an audio processing circuit 212 includes a microphone preamplifier 213, a high pass filter 215, a pre-emphases circuit 217, a low pass filter 219, and a deviation adjustment circuit 221, which are connected in series with one another. The output of the microphone 210 is coupled to the input of the microphone preamplifier 213 on the conductor 210A. The high pass filter 215 is electrically connected between the output of the microphone preamplifier 213 ad the input of the pre-emphasis circuit 217 by conductors 213A and 215A respectively. The output of the low pass filter 219 is connected to the input of the deviation circuit 221 by a conductor 219A.

The output of the audio processing circuit 212 is connected by a conductor 221A to a radio frequency modulator 222 which modulates the outgoing audio signal on a predetermined carrier frequency signal. The radio frequency modulator 222 generally includes an oscillator/frequency modulator tripler 223, a tripler 25, a radio frequency amplifier 227, a final radio frequency amplifier 229, and a transmit diplexer/audio blocking filter 231, which are connected in series with one another. The output of the deviation network 221 is coupled by the conductor 221A to the input of the oscillator/frequency modulator tripler 223. The tripler 225 is electrically coupled between the output of the oscillator/frequency modulator tripler 22 and the input of the radio frequency amplifier 227 by a pair of conductors 223A and 225A respectively. The output of the radio frequency amplifier 227 is connected to the input of the final radio frequency amplifier 229 by a conductor 227A. The transmit diplexer/audio blocking filter 231 is electrically coupled between the output of the final radio frequency amplifier 229 and the headset antenna 39 by a pair of conductors 229A and 231A respectively.

As best seen in FIG. 5, the switching arrangement 38 includes a power control network 242 for applying and distributing power to the communication unit 34 and a sub-audible tone control network 244 for selecting sub-audible tones to control the establishing of a communication path to a desired one of the customer stations, such as stations 14 and 16. The sub-audible tone control network 244 is coupled to the input of the modulator 222 by a conductor 257A for causing a selected sub-audible tone to be modulated on the carrier frequency. The power control network 242 is also coupled to the modulator 222 for supplying the necessary power to drive the modulator 222.

The switching arrangement 38 also includes a group of push button switches such as a power on/off switch 245 and the paging switches 38A and 38B. The switches 38A, 38B and 245 are mounted to a housing unit (not shown) that can be removably attached to the waist of the customer service representative 30 by the belt B. The housing unit includes means not shown for mounting the various circuits of the communication unit 34 within the housing. The switches 38A, 38B and 245 are conveniently mounted to the top surface of the housing so the service representative 30 may easily actuated the individual switches for selecting a desired customer station, such as station 14, for interactive verbal communications.

Figure 6A:
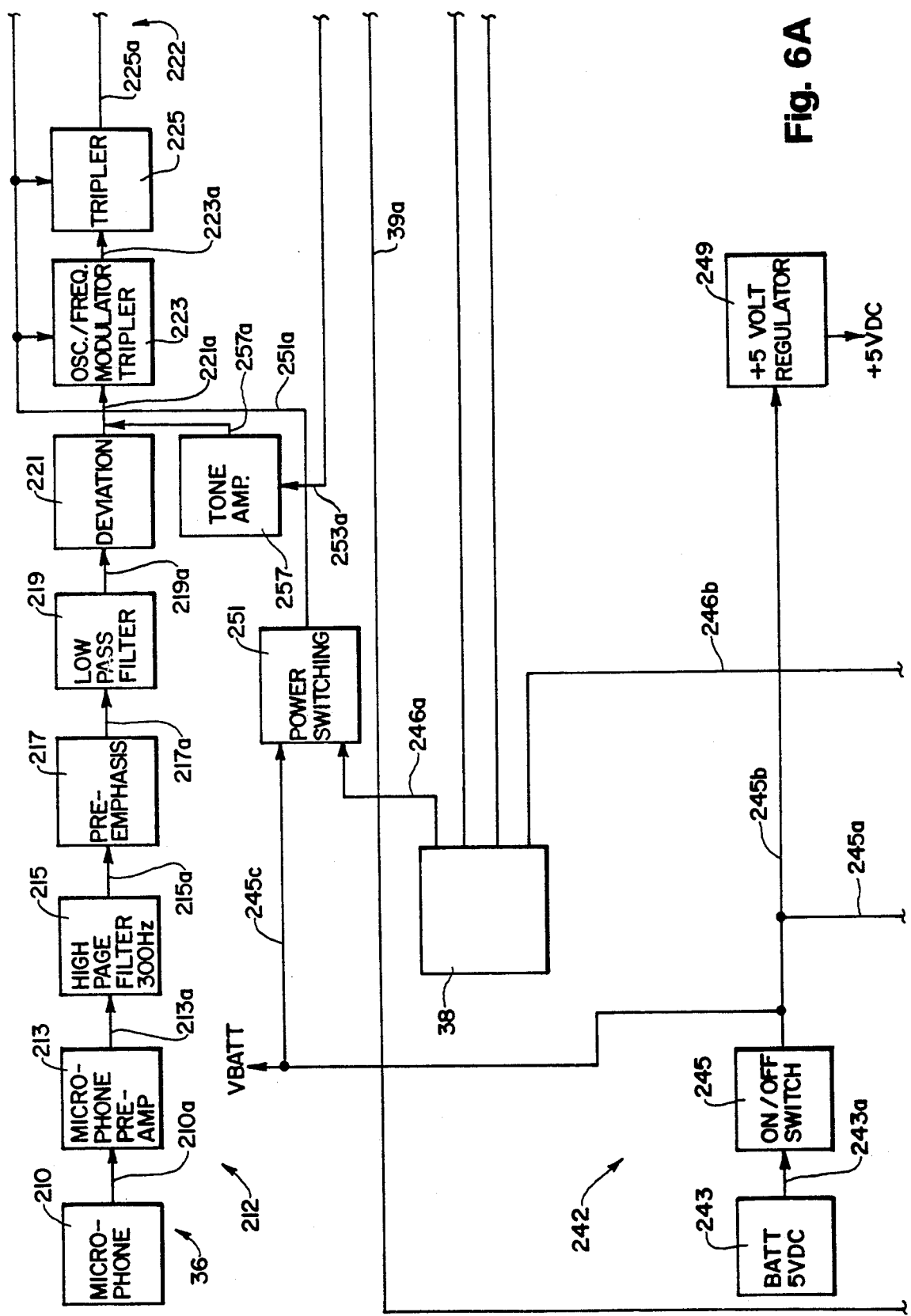
Figure 6C:
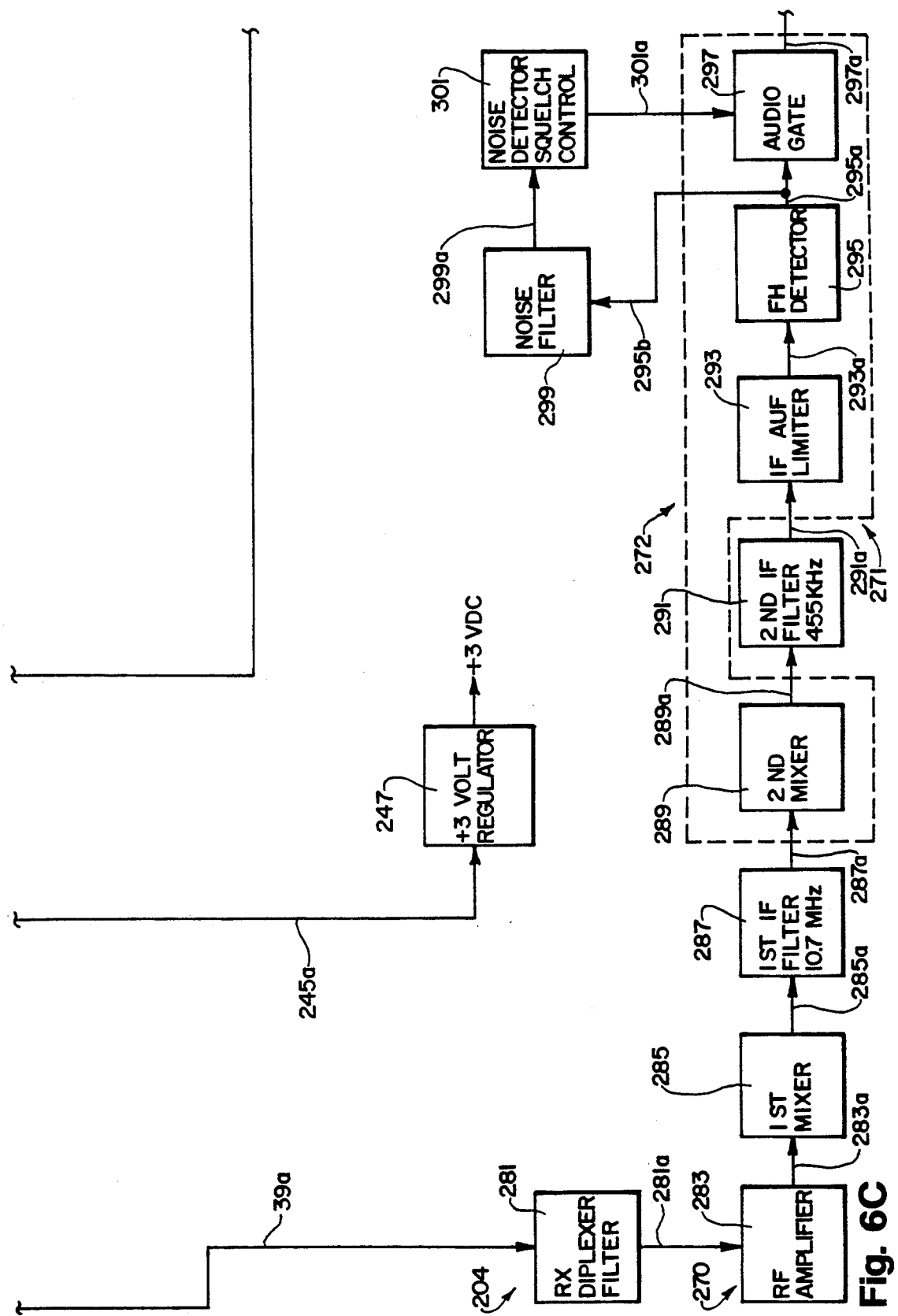

Considering now the power control network 242 in greater detail with reference to FIG. 6, the power control network 242 includes a rechargeable power source, such as a battery 243. The output of the battery 243 is coupled by a connector 243A to the on/off switch 245 for connecting the electrical power from the battery 243 to the various circuits of the communication unit 34. The output of switch 245 is coupled to a pair of voltage regulators 247 and 249 via a pair of conductors 245A and 245B respectively. Voltage regulator 247 is a +3 VDC voltage regulator, while voltage regulator 249 is a +5 VDC voltage regulator. Direct current voltage from regulators 247 and 249 is distributed to the various circuits in the communication unit 34 by means not shown. The output of switch 245 is also coupled to a power amplifier 251 via a conductor 245C. The power amplifier 251 is a conventional power switching amplifier for supplying power to the modulator 222. The output of the power amplifier 251 is coupled to the modulator 222 by a conductor 251A. An individual switch (not shown) in the switching arrangement 38 is coupled to the power amplifier 251 by a conductor 246A for permitting the customer service representative 30 to actuated the power amplifier 251.

Considering now the sub-audible tone control network 244 in greater detail with reference to FIG. 6, the sub-audible tone control network 244 generally includes a sub-audible tone generator 253 for generating a selectable set of sub-audible tones. In this regard, in the preferred embodiment of the present invention the sub-audible tone generator 253 produces two sub-audible tones: a first tone for selecting a communication path with the "A" customer station 14 and a second tone for selecting a communication path with the "B" customer station 16. The sub-audible tone control network 244 also includes a tone amplifier 257 for amplifying the sub-audible tone so that it may be modulated onto the carrier frequency by the modulator 222. The tone amplifier 257 is coupled between the sub-audible tone generator 253 by a conductor 253A and the input to the modulator 222 by a conductor 257A.

In order to allow only those messages transmitted by base station 12 to be heard by the service representative 30, the sub-audible tone control network 244 further includes a sub-audible tone decoder 259 for decoding a sub-audible tone generated by means not shown in the base station 12. The base station sub-audible tone is carried on the carrier frequency along with the audio signal for controlling an audio gate 261 for attenuating the audio signal received by the receiver 204. In this regard, the sub-audible tone decoder 259 is electrically coupled to a selection switch (not shown) in the switching arrangement 38 by a conductor 246B and the audio gate 261 by a conductor 259A. The service representative 30 is able to activate the sub-audible tone decoder 259 via the selection switch (not shown) for making certain that all received signals originate from base station 12

Considering now the radio receiver 204 in greater detail with reference to FIG. 5 and 6, the receiver 204 enables the communication unit 34 to receive transmission signals transmitted by a customer via the base station 12. The radio receiver 204 generally comprises a tuning circuit 270 for tuning in to the carrier frequency transmitted by the base station 12, a demodulating circuit 272 for separating the audio frequency signals from the high frequency carrier, a low-frequency amplifier stage 274 and an earpiece 276 for permitting the service representative 30 to hear the transmitted verbal messages.

Considering now the tuning circuit 270 in greater detail with reference to FIG. 6, the tuning circuit 270 generally comprises a receiver duplexer/audio blocking filter 281, a radio frequency amplifier 283, a first mixer 285, a first intermediate frequency filter 287, a second mixer 289, and a second intermediate filter 291 which are connected in series with one another. The input of the receiver diplexer filter 281 is connected to the antenna 39 via a conductor 39A in order to permit the receiver 204 to process the transmission signals transmitted by the base station 12. The radio frequency amplifier 283 is coupled between the output of the receiver diplexer filter 281 via a conductor 281A and the input of the first mixer 285 via a conductor 283A. The output of the first mixer 285 is coupled by a conductor 285A to the first intermediate frequency filter 287. The second mixer 289 is coupled between the output of the first intermediate filter 287 and the input of the second intermediate filter 291 by a pair of conductors 287A and 289A respectively. The output of the second intermediate filter 291 is coupled to the input of the demodulating circuit 272.

Considering now the demodulating circuit 272 in greater detail with reference to FIG. 6, the demodulating circuit 272 generally comprises an intermediate frequency amplifier limiter 293, a fm detector 295, an audio gate 297 and a de-emphasis circuit 303 which are connected in series with one another. The demodulating circuit 272 also includes a noise filter 299 and a noise detector/squelch control 301 connected in series with one another from the output of the fm detector 295 by a conductor 295B and the control input of the audio gate 297 by a conductor 301A.

The output of the tuning circuit 270 is connected to the input of the intermediate amplifier limiter 293 by the conductor 291A. The fm detector 295 is electrically coupled between the output of the intermediate amplifier 293 via a conductor 293A and the input of the audio gate 297 by a conductor 295A. The output of the fm detector 295 is also connected to the input of the noise filter 299. The noise detector/squelch control 301 is coupled between the output of the noise filter 299 via a conductor 299A and the control input to the audio gate 297 by the conductor 301A. The output of the audio gate 297 is connected to the input of the de-emphasis circuit 303 by a conductor 297A. The output of the de-emphasis circuit 303 is connected to the output of the low-frequency amplifier stage 274 by a conductor 303A.

Considering now the low frequency amplifier stage 274 in greater detail with reference to FIG. 6, the amplifier stage 274 generally comprises an audio amplifier 305, a high pass filter 307, an audio gate 309, a side tone attenuator 311, a volume control circuit 313, an audio power amplifier 315, a radio frequency blocking filter 317, and the earpiece 276 which are connected in series with one another. The amplifier stage 274 also includes a series connected audio gate 261 and attenuator 263 which are connected across the audio gate 309 and side tone attenuator 311 by a pair of conductors 307B and 263A respectively. The output of the audio gate 261 is connected to the input of the attenuator 263 by a conductor 261A.

The output of the demodulation stage 274 is connected to the input of the audio amplifier 305 by a conductor 303A. The high pass filter 307 is electrically coupled between the output of the audio amplifier 305 by a conductor 305A and the input of audio gate 309 by a conductor 307A. The output of the high pass filter is also connected to the audio gate 261 by the conductor 307B. The output of the audio gate 309 is connected to the input of the side tone attenuator 311 by a conductor 309A. The volume control 313 is connected between the output of the side tone attenuator 311 by a conductor 311A and the input of the audio power amplifier 315 by a conductor 313A. The output of the audio power amplifier 315 is connected by a conductor 315A to the radio frequency blocking filter 317 whose input is connected to the earpiece 276 by a conductor 317A.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A drive through half duplex communication system for enabling a company representative to communicate selectively with a plurality of customers seated in vehicles positioned in different drive-up lanes, comprising:
    a plurality of customer stations disposed at different ones of the drive-up lanes;
    a company representative station for two-way communicating with said customer stations selectively;
    said company representative station including at least one transceiver communication unit for communicating with individual ones of said plurality of customer stations selectively;
    said unit including one manually operable dedicated device for controlling half duplex communications between the company representative and a certain individual one of the plurality of customers;
    said unit including another manually operable dedicated device for controlling half duplex communications between the company representative and a certain individual another one of the plurality of customers;
    said company representative station further including switching means responsive to one actuation sequence of the one manually operable dedicated device for establishing a half-duplex path between the communication unit and said certain individual one of the plurality of customers and responsive to another actuation sequence of the one manually operable dedicated device for terminating the established half-duplex path between the communication unit and said certain individual one of the plurality of customers; and
    said switching means responsive to one actuation sequence of the another manually operable dedicated device for establishing a half-duplex path between the communication unit and said certain individual another one of the plurality of customers and responsive to another actuation sequence of the another manually operable dedicated device for terminating the established half duplex path between the communication unit and said certain individual another one of the plurality of customers.

2. A communication system according to claim 1, wherein said transceiver communication unit is a wireless transceiver.

3. A communication system according to claim 1, wherein each one of the plurality of customer stations includes a paging switch connected electrically to said company representative station.

4. A method of communicating between a company representative communication unit and a plurality of remote customer stations, comprising:
    actuating a single switch for at least a given predetermined period of time to cause a communication path establishment signal to be produced;
    responding to said communication path establishment signal by establishing a half duplex outgoing communication channel between the communication unit and a selected one of the plurality of remote customer stations;
    deactuating said single switch to cause a voice transmission enable signal to be produced;
    responding to said voice transmission enable signal by establishing a half duplex incoming communication channel from said selected one of the plurality of remote customer stations and the communication unit;
    actuating said single switch on and off in a rapid manner to cause a communication path termination signal to be produced; and
    responding to said termination signal by terminating the communication path between the communication unit and said selected one of the plurality of customer stations.

5. A method of communicating according to claim 4, further comprising:
    actuating another single switch for at least another given predetermined period of time to cause another communication path establishment signal to be produced;
    responding to said another communication path establishment signal by establishing another half duplex outgoing communication channel between the communication unit and a selected another one of the plurality of remote customer stations;
    deactuating said another single switch to cause another voice transmission enable signal to be produced;
    responding to said another voice transmission enable signal by establishing another half duplex incoming communication channel from said selected another one of the plurality of remote customer stations and the communication unit;
    actuating said another single switch on and off in a rapid manner to cause another communication path termination signal to be produced; and
    responding to said another communication path termination signal by terminating the communication path between the communication unit and the selected another one of the plurality of customer stations.

* * * * *